United States Patent [19]

Diaz

[11] Patent Number: 5,197,774
[45] Date of Patent: Mar. 30, 1993

[54] MOBILE OFFICE

[75] Inventor: Victor M. Diaz, Chula Vista, Calif.

[73] Assignee: Califormula del Nor Oeste, Tijuana, Mexico

[21] Appl. No.: 865,963

[22] Filed: Apr. 9, 1992

[51] Int. Cl.$^5$ .............................................. B62D 31/04
[52] U.S. Cl. ...................................... 296/24.1; 296/64
[58] Field of Search ........................... 296/24.1, 64, 21

[56] References Cited

U.S. PATENT DOCUMENTS

| | | | |
|---|---|---|---|
| 3,054,469 | 9/1962 | Müller | 296/64 X |
| 3,184,766 | 5/1965 | Mortrude | 296/64 X |
| 4,550,946 | 11/1985 | Hanemaayer | 296/156 |
| 4,712,822 | 12/1987 | Janos et al. | 296/24.1 |
| 4,964,671 | 10/1990 | Millar | 296/178 |
| 5,106,141 | 4/1992 | Mostashari | 296/24.1 |

Primary Examiner—Robert R. Song
Attorney, Agent, or Firm—Knobbe, Martens Olson & Bear

[57] ABSTRACT

A motor coach including a motor vehicle with a body having a front, a middle, a back and at least three axles. An engine compartment is located in the back and a driver's station is located in the front from which a driver can pilot the coach. A first door is located in the front, providing outside access to the driver's station. A second door is positioned in one of the sides of the coach, providing outside access to the vehicle. The coach includes a broadcast booth in the front of the motor vehicle, isolated by a bulkhead and a third door from the second door, wherein the broadcasting booth contains equipment for broadcasting over commercial airwaves. Desirably, the motor vehicle includes an upper level and a lower level, and the driver's station is on the lower level. A stairway is provided from the lower level to the upper level, and a partition separates the driver's station from the upper level. Desirably, a rear bulkhead and door are provided to form an office separate from said broadcast booth. Advantageously, the motor coach further includes a telescopic antenna for enhancing the broadcasting ability of the coach.

23 Claims, 5 Drawing Sheets

MOBILE OFFICE

FIELD OF INVENTION

This invention relates to mobile offices and, in particular, to mobile broadcasting studios.

BACKGROUND OF THE INVENTION

Today's executives are increasingly out "on the road," meeting clients, inspecting construction sites and attending events, such as trade shows. By getting out of the office, the executive hopes to increase his or her effectiveness by collecting information and disseminating instructions directly and without delay, thereby allowing the executive to immediately respond to a change in circumstances as it occurs.

Often times, by going into the field, it is possible for the executive to increase the quality and timeliness of the information upon which he or she can act. Unfortunately, when the executive is in the field, he or she is often limited in responding to situations due to the absence of the type of facilities and support which are generally found in the office environment. Specifically, due to the various distractions in the field, it is difficult to hold a productive meeting. Certainly, communication aids such as audio-visual equipment are rarely available or practical for use in the out-of-office environment. Furthermore, although mobile phones and even mobile fax machines are available, rarely does the quality and variety of communication equipment approach that which is expected in a normal office environment.

Other aspects of working in the field also detract from the effectiveness of executive. Specifically, entertaining customers or important guests often plays a prominent role in establishing a relationship of trust necessary for cooperation. Unfortunately, at remote locations, a facility having a suitable atmosphere may not be available. Furthermore, a lack of more basic requirements such as nourishment and adequate restroom facilities may hamper the executive's effectiveness.

Since newscasters provide the service of providing the general public with current information regarding their community, broadcasters in particular have moved their broadcast teams into the field. These broadcast teams often travel in a mini-van equipped to transmit a radio or television broadcast to the listener. The mini-vans typically house broadcasting equipment which allows the broadcast to be transmitted directly to the listener.

While providing sufficient mobility, the back of the mini-van incorporating the equipment is typically dark, cramped and noisy. As a result, interviews are ordinarily conducted outside the van where there is often a significant amount of noise and other distractions. Specifically, an interview will often draw an audience, the noise from which may make it difficult to understand the interviewee. Additionally, the audience may create a threatening or uncomfortable environment which may limit the level of cooperation the interviewee is willing to provide.

While larger trailers exist, they likewise tend to be dark and limited to housing technicians. Additionally, these vehicles are typically towed behind a truck and are not designed to be used during transport. Furthermore, these trailers tend to be difficult to maneuver and park.

While it is desirable to remove the interviewee from the noise and unwanted distraction of the surrounding environment, it would be desirable for the interviewee to remain in visual contact with the location of interest, both to maintain an emotional connection with the ongoing events and to be able to react to a change in those events on a real-time basis.

Accordingly, there is needed an improved means of supportive executives on the road and, particularly, there is needed an improved mobile broadcasting studio which enables the executive or newscaster to visit remote locations without the loss or the comfort and support capabilities of the office.

SUMMARY OF THE INVENTION

Applicant's invention is a motor coach having a body, having a front, a middle, a back, an upper level, a lower level, and at least three axles. A driver's station is located on the lower level from which a driver can pilot the coach. A stairway located in the middle of the body connects the lower level to the upper level of the coach. A first door provides outside access to the driver's station. A second door provides outside access to the stairway. A landing is located on the upper level surrounding the stairway. The upper level is provided with a forward compartment and a rear compartment, each of which is isolated from the landing by the door and a partition. Desirably, each compartment is provided with a desk, a chair, and a cabinet for electric equipment.

Another aspect of the invention is a motor coach including a motor vehicle with a body having a front, a middle and a back, an upper level, a lower level, and a pair of sides. An engine compartment is located at the back of the lower level. A driver's station is located at the front of the lower level from which the driver can pilot the coach. A first door is located at the front of the lower level, providing outside access to the driver's station. A stairway connecting the lower level to the upper level is located in the middle of the motor vehicle body. An entry is located at the foot of the stairway and forms a noise barrier between the engine compartment and the entry. A second door is provided gives outside access to the entry. A bulkhead separates the driver's station from the entry, and at least one partition separates the upper level from the engine compartment and the driver's station. The coach further includes a forward compartment and a rear compartment on the upper level, wherein each of the compartments is isolated by the landing at the head of the stairway by a bulkhead and a door.

Yet another aspect of the present invention is a motor coach including a motor vehicle with a body having a front, a middle, a back and at least three axles. An engine compartment is located in the back and a driver's station is located in the front from which a driver can pilot the coach. A first door is located in the front, providing outside access to the driver's station. A second door is positioned in one of the sides of the coach, providing outside access to the vehicle. The coach includes a broadcast booth in the front of the motor vehicle, isolated by a bulkhead and a third door from the second door, wherein the broadcasting booth contains equipment for broadcasting over commercial airwaves. Desirably, the motor vehicle includes an upper level and a lower level, and the driver's station is on the lower level. A stairway is provided from the lower level to the upper level, and a partition separates the driver's station from the upper level. Desirably, a rear bulkhead and door are provided to form an office separate from said broadcast booth. Advantageously, the motor coach further includes a telescopic antenna for enhancing the broadcasting ability of the coach.

DETAILED DESCRIPTION OF THE PREFERRED EMBODIMENT

Figure 1:
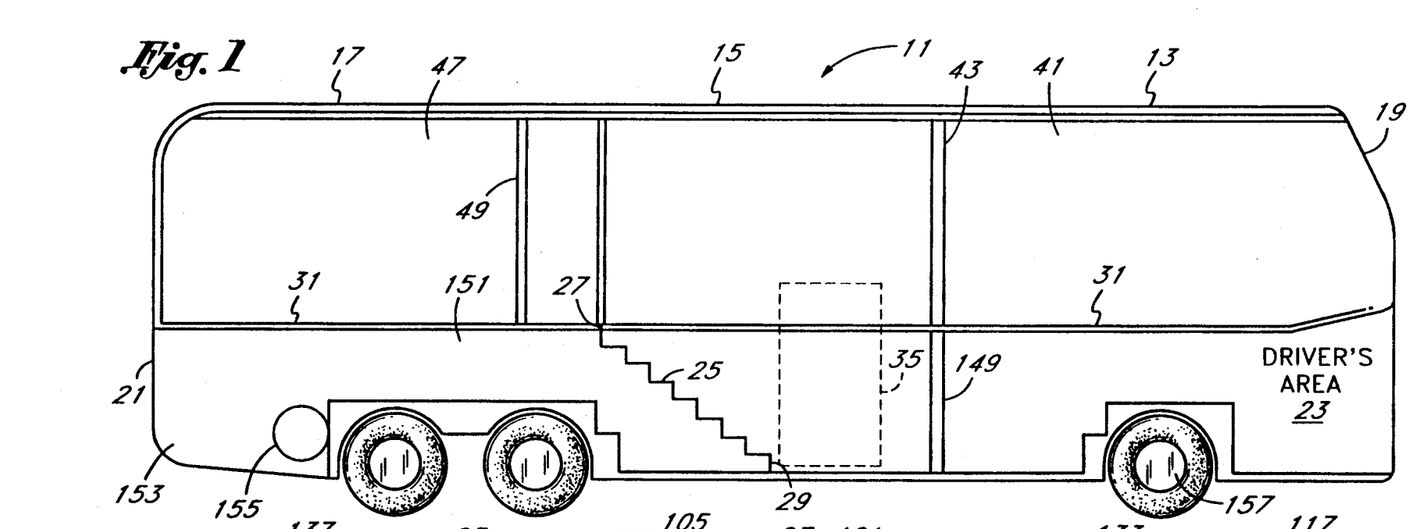
FIG. 1 is a schematic side view of a preferred embodiment of the motor coach embodying the present invention.
Figure 2:
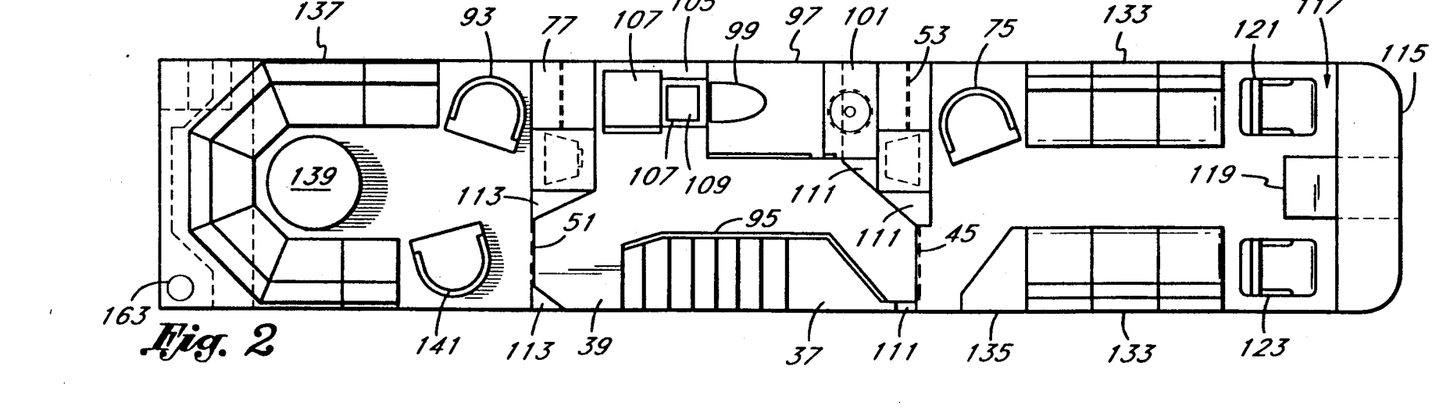
FIG. 2 is a top plan view of the layout of the upper level of the motor coach of FIG. 1.

Referring to FIGS. 1 and 2, there is shown an improved motor coach 11 embodying the present invention. The motor coach has a front portion or front 13, a middle portion or middle 15, and a back portion or back 17. The coach is divided into an upper level 19 and a lower level 21. A driver's station 23 from which a driver can pilot the coach is located in the front 13 on lower level 21 of the motor coach. A stairway 25 having a head 27 and a foot 29 is positioned in the middle 15 of the motor coach and connects the lower level 21 to the upper level 19. The upper level 19 and lower level 21 are separated from one another by at least one horizontal partition 31. Desirably, the partition 31 extends from the forward end of the front 13 of the motor coach to the extreme rear end of the back 17 of the motor coach. It is understood, however, that for ease of manufacture, the partition may comprise several segments. Desirably, the segments would overlap to provide better sound insulation characteristics.

A first driver's door 33 is located on the right side of the front of the vehicle. A second or stairway door 35 is positioned proximate the foot 29 of the stairway 25 on the right side of the motor coach. The door 35 opens to a generally quadrilateral shaped entry 37 large enough to allow one to turn comfortably and face the stairway 25 after entering the stairway door 35. The stairway 27 is surrounded by a generally C-shaped landing 39. The motor coach includes an elongate forward compartment defined by a first or forward vertical bulkhead 43 and a third or forward door 45 which isolates the forward compartment from the landing 39. Likewise, an elongate rear compartment 47 is formed by a second or rear vertical bulkhead 49 and a fourth or rear door 51 which separates the rear compartment from the landing 39.

Desirably, the forward and rearward compartments, 41 and 47, comprise two mobile offices. Preferably, the forward compartment comprises a broadcasting station and the rear compartment comprises a combination support office and entertainment area. Accordingly, as will be discussed in detail below, an important aspect of the invention is the interrelationship of the various aspects of the layout of the upper and lower levels to provide privacy and a relatively quiet broadcast environment.

Figure 3:
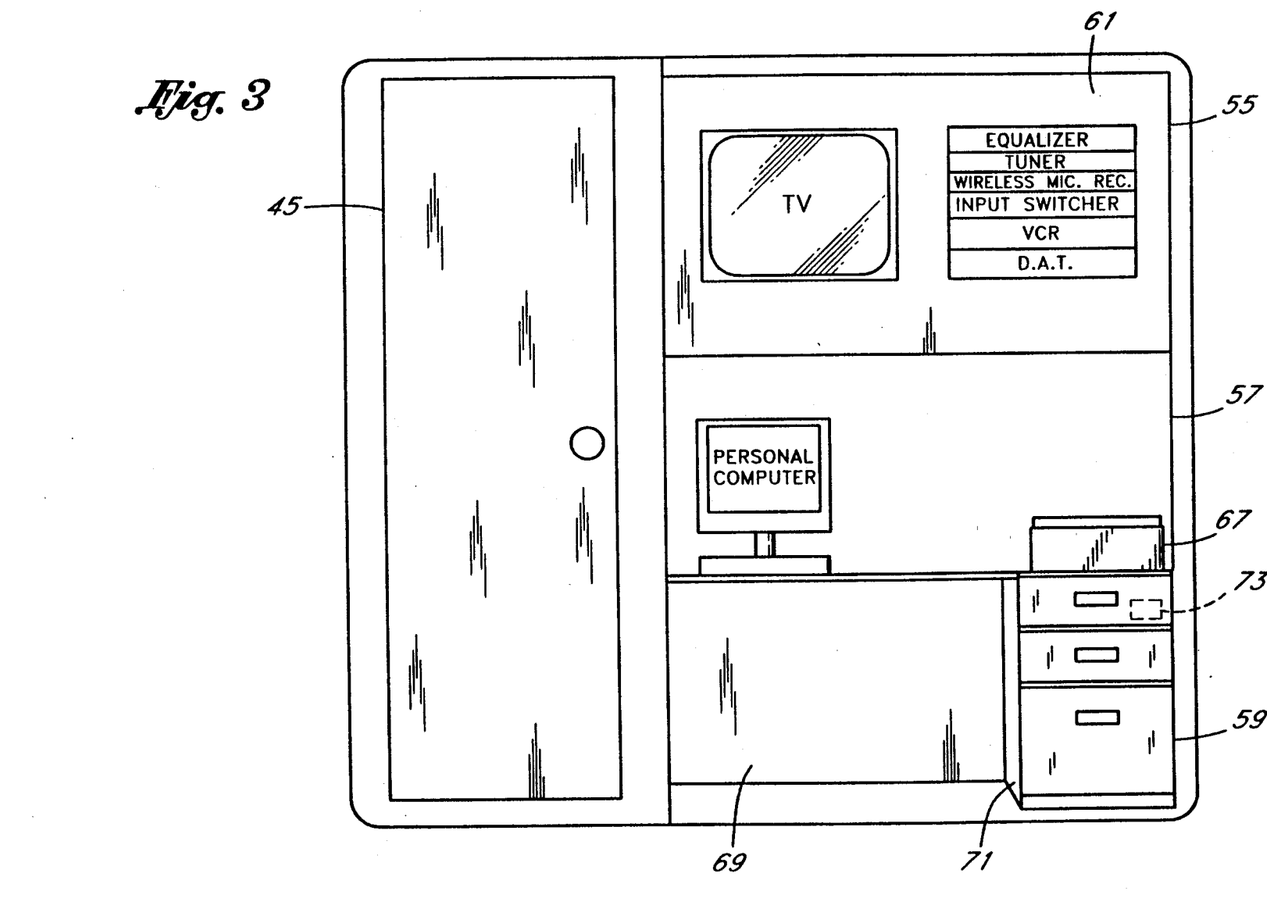
FIG. 3 is a front elevational view of the rear end of the forward compartment of the motor coach of FIG. 1.

To this end, the forward bulkhead 43 desirably forms a quadrilateral-shaped forward recess 53 which includes an upper portion 55, a middle portion 57 and a lower portion 59. Referring to FIG. 3, the upper portion 55 desirably houses an electronics cabinet or audiovisual center 61 including a television, an equalizer, a tuner, a wireless microphone recorder, an input switcher, a video cassette recorder and a DAT tape player. The middle portion 57 of the forward recess 53 preferably is provided with a desk top or desk 63 supporting a personal computer 65 and a facsimile machine 67. The lower portion 59 of the forward recess 53 desirably defines a leg space 69 for a person sitting at the desk, as well as a set of drawers 71 for storage of papers and other items. Advantageously, a cellular telephone 73 may be stored in one of the set of drawers 91. A desk chair 75 is desirably provided to permit one to work comfortably on the desk top 63.

Figure 4:
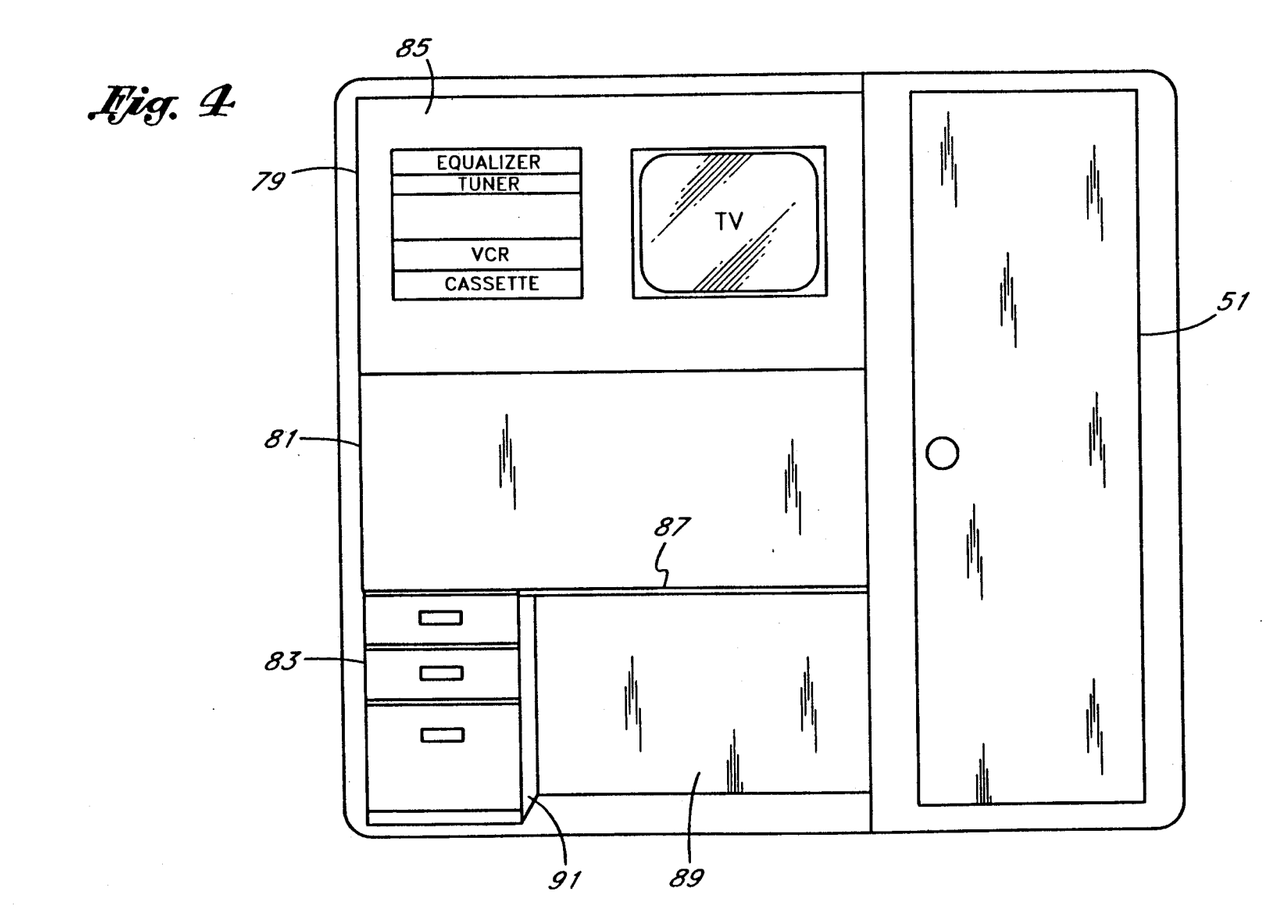
FIG. 4 is a rear view of the forward end of the rear compartment of the motor coach of FIG. 1.

Referring now to FIGS. 2 and 4, the rear bulkhead 49 preferably defines a quadrilateral-shaped back recess 77 including an upper portion 79, a middle portion 81 and a lower portion 83. Advantageously, the upper portion 79 will house an electronics cabinet or audiovisual center 85, including a television monitor, an equalizer, a tuner, a video cassette recorder, and a cassette player. Likewise, the middle portion 81 of the back recess 77 will advantageously be provided with a desk top or desk 87 to provide another convenient working area. Furthermore, the lower portion 83 will preferably define a leg space 89 for the person working at the desk and a set of drawers 91 for convenient storage. A desk chair 93 is desirably provided to permit one to work comfortably on the desk top 87.

The middle 15 of the motor coach 11 will now be described in greater detail. Referring to FIG. 2, a railing 95 is provided around the side of the landing bordering the entry 37 and stairway 25, with the exception of the area directly at the head 27 of the stairway 25. A restroom 97 having a front end and a rear end is positioned along the left-hand side of the motor coach adjacent the forward bulkhead 43. The restroom 97 should at least partially insulate the forward compartment from sound emanating from an open stairway door 35. The restroom 97 includes a toilet 99 and a sink 101. In an effort to minimize any noise from the flushing of the toilet 99 in the forward or broadcast compartment 41, the toilet 99 is preferably positioned adjacent the rear end of the restroom distal the forward bulkhead 43. In contrast, noise from the sink 101 adjacent the first bulkhead 43 should be much more conveniently controlled when the station is broadcasting.

The electronics positioned in the audio-visual center 85 of the rear compartment 47 should provide some significant sound insulation for the rear compartment 47. Advantageously, however, a refrigerator 103 is positioned adjacent the rear bulkhead 49 further insulating the desk from noise entering the motor coach 11 when the stairway door 35 is opened. The middle 15 of the motor coach is desirably provided with a galley 105 positioned between the refrigerator 103 and the restroom 97. Desirably, the galley will include a fixed coffee maker 107 which will not fall or break during travel. Likewise, the galley is further desirably provided with a microwave 109 to provide the guest or occupant with the capacity for heating food.

Advantageously, to further insulate the broadcasting compartment 41 from the rest of the motor coach 11, a group of three forward insulation chambers 111 are provided adjacent the forward end of the restroom 97 and on either side of the forward door 45. It is understood that these forward insulation chambers 111 could either be filled with insulation material, such as fiberglass, or could be utilized for storage purposes. Likewise, the rear bulkhead 49 preferably defines a pair of rear insulation chambers 113 on either side of the rear door 51. The rear chambers could likewise be filled with insulation or used for storage.

Figure 5:
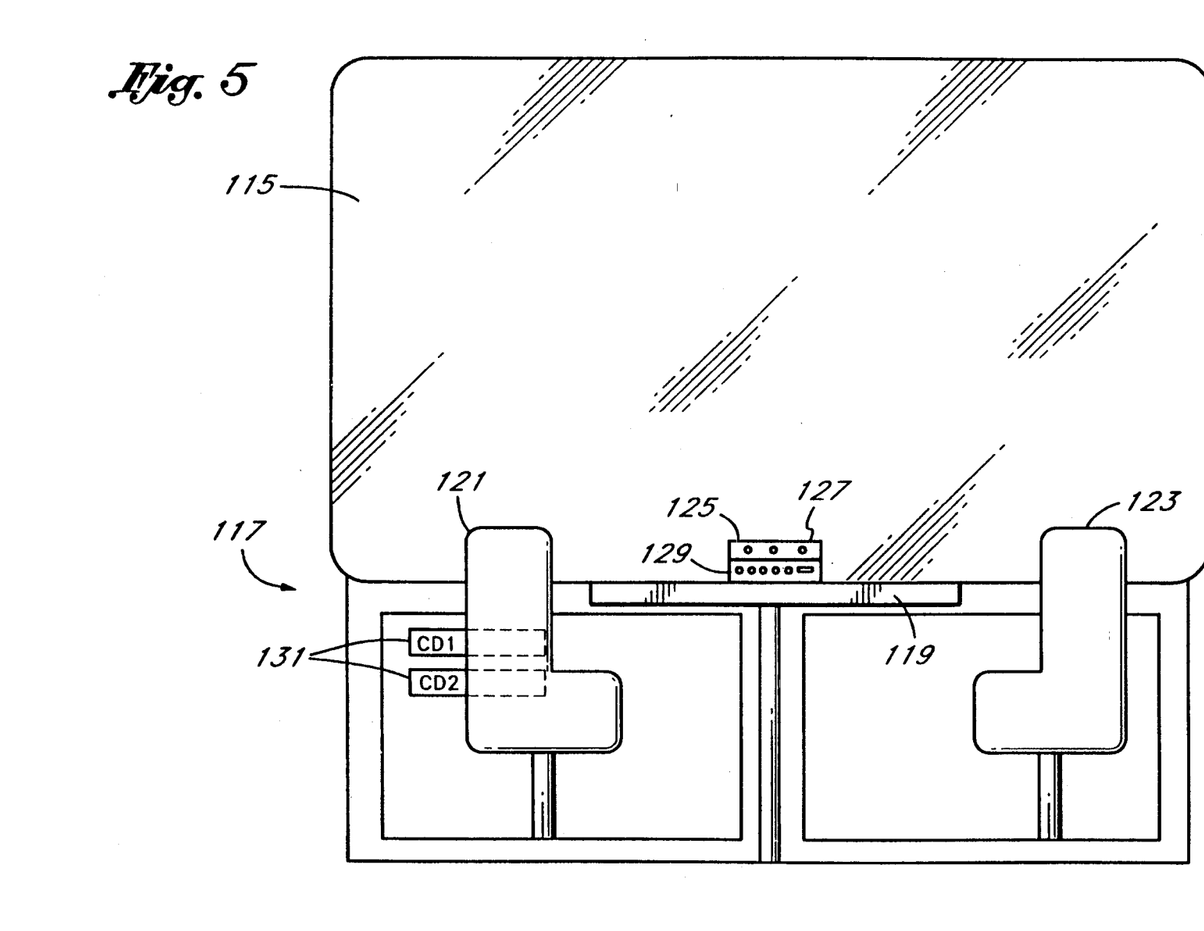
FIG. 5 is a rear elevational view of the forward end of the forward compartment of the motor coach of FIG. 1.

Referring now to FIGS. 2 and 5, at the forward end of the forward compartment 41 is a large wrap-around front window 115 and a broadcasting station 117. The broadcasting station 117 desirably includes a T-shaped interview table 119. The station 117 also desirably includes a host or DJ chair 121 located to the left-side of the interview table and a guest chair 123 located to the right-side of the interview table 119. Preferably, the chairs 121 and 123 can swivel and tilt to permit the host and the guest to comfortably look out the front window at the surrounding scene 115 or at one another. The interview table 119 desirably provides the guest with a comfortable amount of personal space and an easy rest for the beverages and/or written notes. The station is desirably provided with PZM-type microphones 125, a microphone control and transmitter 127 and a mixer 129. Adjacent the DJ chair 121 are preferably a number of CD players 131. This equipment is preferably adapted to broadcast over commercial public airwaves.

Referring again to FIG. 2, the front compartment is desirably provided with a pair of facing couches 133 extending along either side of the forward compartment 41. These couches 133 provide space for additional interviewees, such as, for example, when the DJ desires to interview a group of individuals at the same time. Desirably, each of the facing couches has at least three cushions to comfortably seat three or more people. Additionally, an end table 135 is provided at the rear of the right side couch, for holding beverages or written materials.

Referring to FIG. 2, the rear compartment 47 will now be described in greater detail. It is anticipated that the rear compartment 47 will not only provide a separate office area, but will also provide a meeting or entertainment area. To this end, a generally C-shaped sectional couch 137 is provided which extends along both sides of the rear compartment 47 and connects along the rear end of the rear compartment. The semi-circular design of the sectional couch permits a relatively large number of parties to have eye contact with one another, thereby facilitating multi-party conversation. Advantageously, the couch 137 has a two cushion section along each side of the motor coach and a three cushion connecting section. Desirably, a circular table 139 is provided within the interior of the sectional couch 137 to provide a convenient support for beverages and papers. Advantageously, an additional movable chair 141 is provided so that the desk chair 93 and additional chair 141 can effectively complete the circle partially formed by the sectional couch, thereby permitting an even larger number of parties to meet in the rear compartment 47 and maintain eye contact.

Referring now to FIG. 1, the lower level 21 of the motor coach 11 the driver station 23 is provided with a driver seat 143 and, preferably, with a copilot seat 145. Located in the front 13 of the motor coach, but behind the driver's area is a luggage compartment 147. In addition to providing desirable capacity for carrying personal luggage and additional equipment, this luggage compartment 147, particularly when filled with luggage, provides significant sound insulating characteristics. The luggage compartment is separated from the entry 37, and therefore the stairway 25 by a lower vertical bulkhead 149. The stairway itself provides insulation between noise entering the motor coach 11 from the open stairway door 35. A back baggage compartment 151 is provided to the rear of the stairway 25, which similarly, provides sound insulation for the rear compartment 47 when filled with baggage. An engine compartment 153 is located at the rear of the back 17 of the motor coach 11.

As will be appreciated, the motor coach layout advantageously provides the greatest possible separation between the noise of the engine and the broadcasting station 117. Additionally, a water tank 155 is located adjacent the engine compartment to provide water for the toilet 99 and sink 101.

On a macro level, the motor coach is preferably provided with a forward axle 157 immediately behind the driver's station 23 and a double rear axle 159 positioned below the back baggage compartment 151. A pair of forward side windows 165 extending roughly the length of the facing couches 133 are located on either side of the front 13 of the motor coach, adjacent the ends of the front window 115. Similarly, the rear compartment 47 is provided with a pair of quadrahedral-shaped rear side windows 167, extending roughly the length of the sides of the sectional couch 137. The lower level 21 of the motor coach is provided with a windshield 169 at the forward end of the front 13 of the motor coach, and a pair of driver's side windows 171 are provided, one on each side of the motor coach.

The motor coach 11 is desirably provided with a vertical exhaust 161 at the top of the left side of the rear end of the back 17 of the motor coach.

Figure 6:
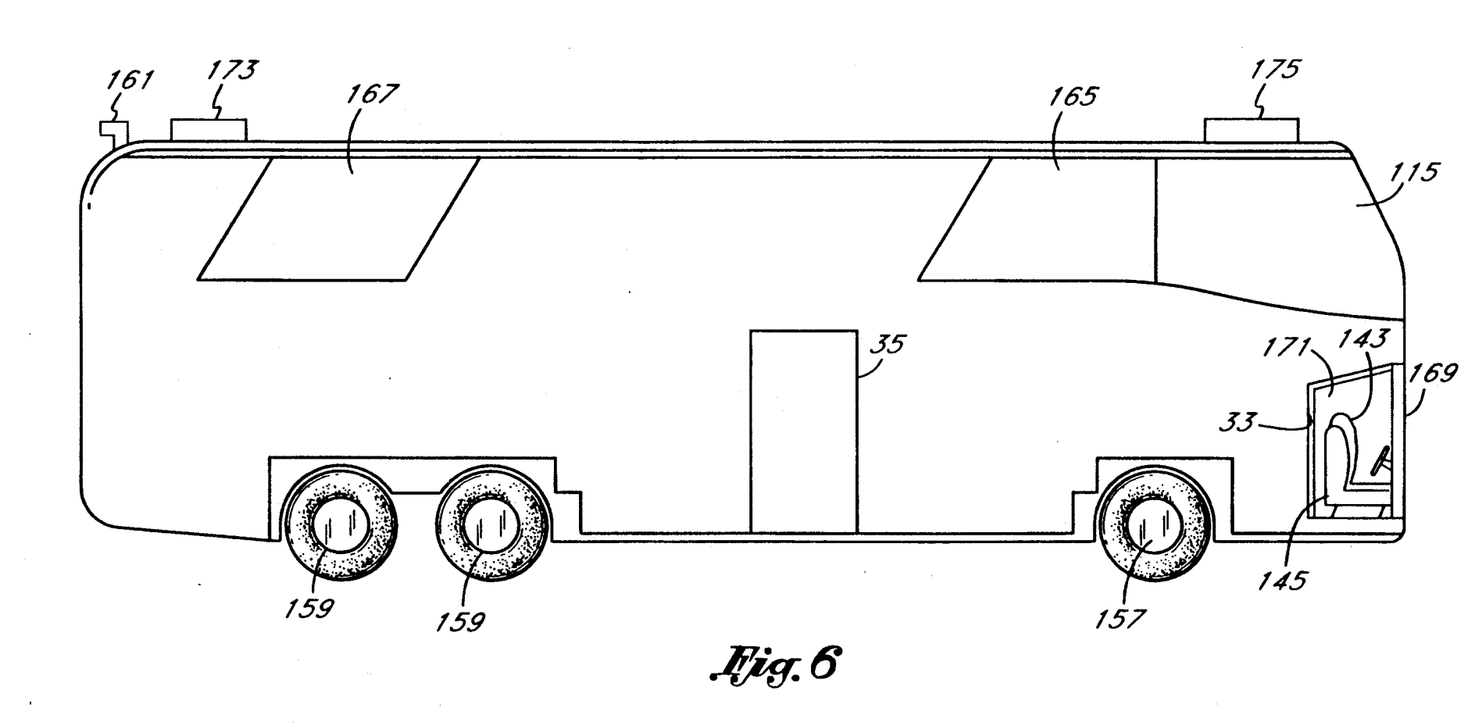
FIG. 6 is a side elevational view of the motor coach of FIG. 1.

Advantageously, the motor coach 11 is provided with a telescopic antenna 163 located on the right rear end of the back 17 of the motor coach away from the exhaust to improve the ability of the electronic equipment in the coach to send and receive information. The motor coach may also be provided with rear speakers 173 positioned at the rear end of the top of the motor coach, so as to be positioned away from the broadcasting station 117. On the other hand, depending upon the application intended, forward speakers 175 could also be provided on top of the front of the motor coach.

The above-described motor coach meets the needs of executives for facilities when executives are on the road. The mobile coach permits the executives to inspect construction sites and attend events to improve the quality and timeliness of the information upon which they act, without limiting their ability to respond to this information by providing facilities and support equipment necessary for this purpose. The private entry 37 and stairway 25 provides an inviting and comfortable entryway secluded from the driver's station 23. The rear compartment provides an excellent meeting facility for nine or more people. The rear compartment 47 provides privacy and relative quiet, particularly when the vehicle is at rest and the engine is turned off. In this state, the engine compartment 153, water tank 155 and baggage compartment 151 act as sound insulators.

Further, as discussed above, the C-shaped sectional coach 137 facilitates meetings by permitting a high degree of eye contact between the participants. The convenient central circular cable 139 provides a rest for beverages and papers, and the rear audio/visual center permits the use of audio/visual aides during the meeting. Importantly, the desk 87 and desk chair 93 provide an excellent workstation for technical or secretarial support personnel. If documents need to be drafted, it would of course be possible to add a personal computer and printer to the workstation. Coffee and food are desirably available from the refrigerator 103, galley 105, coffee machine 107 and microwave 109 to help keep attendees alert and focused during the meeting. Likewise, the restroom 97 on board prevents the cutting short or delay of meetings to locate restroom facilities elsewhere.

The motor coach 11 is likewise very well suited for entertaining. Again, the private entry 37 and stairway 25 provide an unusual and welcome entryway for the guests. The rear compartment is particularly adapted for entertaining, as many of the needs of a successful host or hostess are identical to those required for a successful meeting. Specifically, comfortable places to recline, sit beverages, and to obtain food and drink are provided. Additionally, the audio/visual center 85 provides entertainment through music, television and/or videotapes. As always, the on-board restroom 97 prevents discomfort and/or complications by avoiding the uncertainties of whether sanitary restroom facilities are available.

While the forward compartment 41 also makes an ideal office, and could also be used as an additional entertainment area, the forward compartment 41 provides an exceptional environment for a radio broadcast studio, and it will be discussed in that framework. Specifically, the mobile coach 11 provides a comfortable and convenient means for broadcasting personnel to travel to an interviewee or to attend an event such as a demonstration or festival. Once again, the private entry 37 and stairway 25 provide a welcoming environment for the prospective interviewee, while the galley 105 and restroom 97 is available to increase the interviewee's level of comfort. When sitting across the interview table 119 in the guest chair 123, the interviewee will normally be segregated from the noise and high level of distraction which is typically present outside of the vehicle. This reduction in noise not only permits the DJ and interviewee to focus on the interview, but will also improve the sound quality of the broadcast. Advantageously, the forward compartment 41 is completely separated from the driver's station 23 by a partition 31. This may enhance the willingness of the interviewee to speak with the broadcaster "off the record" prior to the broadcast. Likewise, during the broadcast, this separation reduces the distraction and noise which would be present if the driver were present in the broadcasting station. As discussed above, the driver's station and luggage compartment provide sound insulation, which further reduces the level of noise in the forward compartment 41.

One aspect of the invention is the positioning of the interview table 119, host chair 121 and guest chair 123 immediately adjacent the large front window 115 of the motor coach. As a result, the interview is conducted in a bright, generally upbeat environment. On the other hand, if the surrounding scene is less positive, then the large front window 115 provides an excellent means of maintaining the interviewee's emotional connection to the ongoing events, while at the same time providing an excellent observation platform to permit the interviewee to address events as they happen.

Often times, the interviewee is asked to comment on an event which transpired some time earlier. In this situation, the audio/visual center 61 provides an indispensable tool to permit the interviewee to view a video cassette or listen to a recording of the earlier event.

The desk 63 provides an excellent workstation for a technical support person to operate during the interview. Likewise, the personal computer 65, fax machine 67 and telephone 73 permit the broadcaster and the stationary home office to quickly and conveniently communicate with one another. Likewise, the personal computer provides an excellent workstation to permit the broadcaster to prepare a script or story while or immediately after the events unfold.

As discussed above, the facing couches 133 permit the broadcaster to seat potential future interviewees or to handle a group interview. Again, the host and guest chairs 121 and 123 are desirably swivel and tilt mounted to permit the interviewer and guest to face both the front window 115 and the couches 133. Again, increased eye contact permitted by the arrangement of the facing couches 133 and chairs 121 and 123 should facilitate interaction between the parties.

It is important to note that the forward recess 53 not only provides space for a workstation and equipment, but effectively increases the thickness of the forward bulkhead 43. That is, the television and additional electric equipment and papers stored on the desk and in the drawers 71 provide sound insulation. Further, the three forward insulation chambers 111 and the arrangement of the toilet 99 and sink 101 in the restroom are further adapted to reduce noise in the forward compartment. Even the position of the galley 105 along the left side of the middle 115 of the motor coach 11 is adapted to limit the amount of noise transmitted to the broadcasting station. Interaction between the two compartments 41 and 47 is facilitated by a wide landing 39 extending between the doors 45 and 51 of the two compartments.

The separate driver's area is provided with a large front windshield 169 and two large side windows 171 to provide the driver with excellent visibility. Likewise, because the driver is separate from the upper level 19 of the motor coach, the driver can focus his or her attention on driving safely. It is contemplated, however, that when the motor coach 11 is at rest, and particularly when the broadcasting station 117 is in use, that the driver will avoid leaving and entering the vehicle.

Referring to FIG. 6, the front and rear speakers 173 and 175 are desirably available to permit the broadcaster to transmit the broadcast or alternative broadcasts or music to the surrounding area. This may be particularly desirable in a festival setting. In this and other applications, the sides of the motor coach can be used as space for advertising, which can be either permanently painted on the sides of the motor coach or comprise banners or other materials temporarily secured to the side of the motor coach.

The described embodiment is to be considered in all respects only illustrative and not restrictive and the scope of the invention is, therefore, indicated by the independent claims rather than by the foregoing description. All changes which come within the meaning and range of equivalency of the claims are to be embraced within their scope.

I claim:

1. A motor coach, comprising:

a motor vehicle including a body having a front, a middle, a back, an upper level and a lower level;

a driver's station on said lower level from which a driver can pilot said coach;

a stairway connecting said lower level to said upper level, said stairway located in the middle of said body;

a partition separating said driver's station from said upper level;

a first door providing outside access to said driver's station;

a second door providing outside access to said stairway;

a landing on said upper level surrounding said stairway;

a forward compartment and a rear compartment on said upper level, each said compartment isolated from said landing by a door and a bulkhead; and, furnishings including a desk, a chair, and a cabinet for electronic equipment in each said compartment.

2. The motor coach of claim 1, wherein said bulkhead separating said first compartment and said landing defines a recess for said desk.

3. The motor coach of claim 2, wherein said bulkhead separating said first compartment and said landing defines a recess for said electronics cabinet.

4. The motor coach of claim 3, wherein said bulkhead separating said first compartment and said landing at least partially supports a desktop for said desk and a plurality of shelves for said cabinet.

5. The motor coach of claim 4, wherein said desk is provided with a personal computer, a telephone and a facsimile machine.

6. The motor coach of claim 1, wherein each said first compartment defines a broadcast booth.

7. The motor coach of claim 6, wherein said front compartment includes a front window and an interview table and a pair of chairs adjacent said front window.

8. The motor coach of claim 7, wherein said front compartment is further furnished with a pair of couches arranged to face one another.

9. The motor coach of claim 6, wherein said bulkhead separating said first compartment and said landing defines a recess for said electronics cabinet.

10. The motor coach of claim 9, wherein said bulkhead separating said first compartment and said landing at least partially supports a desktop for said desk and a plurality of shelves for said cabinet.

11. The motor coach of claim 10, wherein said bulkhead separating said first compartment and said landing defines a recess for said desk.

12. A motor coach, comprising:
a motor vehicle including a body having a front, a middle and a back, an upper level, a lower level and a pair of sides;

an engine compartment at the back of said lower level;

a driver's station at the front of said lower level from which a driver can pilot said coach;

a first door located at the front of said lower level providing outside access to said driver's station;

a stairway having a foot and a head, said stairway connecting said lower level to said upper level, said stairway located in the middle of said body;

a landing on said upper level at said head of said stairway;

an entry at the foot of said stairway, said stairway forming a noise barrier between said engine compartment and said entry;

a second door in one of said pair of sides providing outside access to said entry;

a bulkhead separating said driver's station from said entry;

at least one partition separating said upper level from said engine compartment and said driver's station; and a forward compartment and a rear compartment on said upper level, each said compartment isolated from said landing by a bulkhead and a door.

13. The motor coach of claim 12, wherein said stairway and each of said doors separating said landing from said compartments is positioned along said one of said pair of sides.

14. The motor coach of claim 13, wherein said bulkhead separating said first compartment and said landing and said bulkhead separating said second compartment and said landing each form a recess for a desk and an electronics cabinet.

15. The motor coach of claim 14, further comprising a restroom with a toilet in said middle along said side opposite said stairway.

16. The motor coach of claim 15, further comprising a refrigerator and coffee maker in said middle along said side opposite said stairway.

17. The motor coach of claim 16, wherein said toilet is located along a wall of said restroom distal said bulkhead separating said landing from said first compartment.

18. The motor coach of claim 16, wherein said refrigerator is located adjacent said portion of said bulkhead separating said rear compartment and said landing which forms said recess, so as to provide sound insulation for said rear compartment.

19. A motor coach, comprising:
a motor vehicle including a body having a front, a middle and a back, an upper level, a lower level and a pair of sides;

an engine compartment on said lower level;

a driver's station at the front of said lower level from which a driver can pilot said coach;

a first door located at the front of said lower level providing outside access to said driver's station;

a stairway having a foot and a head, said stairway connecting said lower level to said upper level;

an entry at the foot of said stairs, said stairway forming a noise barrier;

a second door in one of said pair of sides providing outside access to said entry;

a bulkhead separating said driver's station from said entry;

at least one partition separating said upper level from said engine compartment and said driver's station;

a forward office and a rear office on said upper level, each said compartment isolated from said landing by a bulkhead and a door;

furnishings including a desk and a chair in each said compartment.

20. A motor coach, comprising:
a motor vehicle including a body having a front, a middle, a back, a pair of sides and at least three axles;

an engine compartment in said back;

a driver's station in said front from which a driver can pilot said coach;

a first door located in said front providing outside access to said driver's station;

a second door in one of said pair of sides providing outside access to said vehicle; and a broadcast booth in said front isolated by a bulkhead and a third door from said second door, said broadcasting booth containing equipment for broadcasting over commercial public airwaves.

21. The motor coach of claim 20, wherein said motor vehicle includes an upper level and a lower level and said driver's station is on said lower level, further comprising:
   a stairway connecting said lower level to said upper level; and,
   a partition separating said driver's station from said upper level.

22. The motor coach of claim 21, further comprising an office on said upper level isolated from said broadcast booth by a partition and door.

23. The motor coach of claim 22, further comprising a telescopic antenna for enhancing the broadcasting ability of said coach.

* * * * *

UNITED STATES PATENT AND TRADEMARK OFFICE
CERTIFICATE OF CORRECTION

PATENT NO. : 5,197,774

DATED : March 30, 1993

INVENTOR(S) : Victor M. Diaz

It is certified that error appears in the above-indentified patent and that said Letters Patent is hereby corrected as shown below:

```
Column 9, line 35, change "wherein each said" to --wherein said--.
```

Signed and Sealed this

Fourteenth Day of December, 1993

Attest:

BRUCE LEHMAN

*Attesting Officer*      *Commissioner of Patents and Trademarks*